United States Patent [19]

Nakatani et al.

[11] Patent Number: 4,935,311
[45] Date of Patent: Jun. 19, 1990

[54] MAGNETIC MULTILAYERED FILM AND MAGNETIC HEAD USING THE SAME

[75] Inventors: Ryoichi Nakatani, Akigawa; Toshio Kobayashi, Tokyo; Shigekazu Otomo, Sayama; Noriyuki Kumasaka, Ome; Noritoshi Saito, Miyagi, all of Japan

[73] Assignee: Hitachi, Ltd., Tokyo, Japan

[21] Appl. No.: 181,051

[22] Filed: Apr. 13, 1988

[30] Foreign Application Priority Data

Apr. 13, 1987 [JP] Japan .................................. 62-88806
Sep. 25, 1987 [JP] Japan ............................... 62-238719

[51] Int. Cl.$^5$ ................................................ G11B 5/31
[52] U.S. Cl. .................................. 428/611; 428/635; 428/661; 428/681; 428/928
[58] Field of Search ............... 428/928, 665, 635, 653, 428/681, 676, 661, 670, 667, 611, 677

[56] References Cited

U.S. PATENT DOCUMENTS

| | | | |
|---|---|---|---|
| 2,920,381 | 1/1960 | Bozores et al. | 428/928 |
| 3,350,180 | 10/1967 | Croll | 428/928 |
| 3,375,091 | 3/1968 | Feldtkeller | 428/928 |
| 3,531,322 | 9/1970 | Kefalas et al. | 428/928 |
| 3,756,788 | 9/1973 | Whetstone | 428/661 |
| 3,787,237 | 1/1974 | Grunberg et al. | 428/928 |
| 4,049,522 | 9/1977 | Ainslie et al. | 204/192 M |
| 4,103,315 | 7/1978 | Hempstead et al. | 428/928 |
| 4,587,176 | 5/1986 | Carcia | 428/611 |
| 4,678,721 | 7/1987 | den Broeder et al. | 428/928 |
| 4,687,712 | 8/1987 | Sugita et al. | 428/928 |
| 4,767,755 | 8/1988 | Shiiki et al. | 428/928 |

FOREIGN PATENT DOCUMENTS 112797 9/1977 Japan .
61-179509 8/1986 Japan .................................. 428/668

*Primary Examiner*—John J. Zimmerman
*Attorney, Agent, or Firm*—Antonelli, Terry, Stout & Kraus

[57] ABSTRACT

Disclosed is a magnetic multilayered film in which layers of Fe or of an alloy containing Fe as an essential constituent are laminated together with intermediate layers of a nonmagnetic metal. In an embodiment of the magnetic multilayered film, each of the Fe layers or each of the Fe alloy layers is epitaxially grown on at least part of each of the intermediate layers of the nonmagnetic metal. A magnetic head having the magnetic multilayered film is also disclosed. The nonmagnetic metal is at least one of those selected from the group consisting of V, Cr, Cu, Nb, W, Al and Pt.

15 Claims, 4 Drawing Sheets

MAGNETIC MULTILAYERED FILM AND MAGNETIC HEAD USING THE SAME

BACKGROUND OF THE INVENTION

This invention relates to a magnetic multilayered film having a high saturation magnetic flux density and a high permeability. More particularly, the present invention relates to a magnetic head for use in magnetic disk apparatus, magnetic tape recorders (VTR's), etc., and relates also to a magnetic multilayered film suitable as a material for a magnetic core of such a magnetic head.

In order to prevent magnetic saturation of such a magnetic head during recording, the material for the magnetic head is required to have a high saturation magnetic flux density. Also, from the aspect of efficiency of reading with the magnetic head, the material for the magnetic head is required to have a small coercive force and a high permeability.

In order to provide magnetic materials having a high saturation magnetic flux density required for the magnetic head of the kind described above, alloys containing Fe as an essential constituent are now being developed. However, among these alloys, those having a saturation magnetic flux density higher than 1.8 T (tesla) have a large coercive force and are not suitable for use as the material for the magnetic head. Therefore, in an effort to provide a magnetic material having a small coercive force and a high permeability, a multi-layered film structure including a plurality of magnetic material layers laminated together with a plurality of intermediate layers of, for example, $SiO_2$ has been proposed, as discussed in Japanese Patent Application Laid-open No. 52-112797 (JP-A-52-112797) based on U.S. patent application serial No. 662,198 filed on Feb. 26, 1976, now U.S. Pat. No. 4,049,522.

However, a multilayered film structure in which a plurality of layers of an alloy containing Fe as an essential constituent are laminated together with a plurality of intermediate layers of a nonmagnetic metal oxide, for example, $SiO_2$ or $Al_2O_3$ has had such a problem that its coercive force is not sufficiently decreased depending on the composition of the alloy of Fe. Further, such a multilayered film structure has had another problem that its saturation magnetic flux density is greatly decreased, because the nonmagnetic metal oxide such as $SiO_2$ or $Al_2O_3$ is porous, and the Fe alloy deposited directly on the intermediate layer of $SiO_2$ or $Al_2O_3$ includes many defects such as vacancies.

SUMMARY OF THE INVENTION

With a view to solve the prior art defects pointed out above, it is an object of the present invention to provide a magnetic multilayered film having a small coercive force, a high permeability and a high saturation magnetic flux density and also to provide a magnetic head using such a magnetic multilayered film for the purpose of high density magnetic recording.

The inventors conducted research and study of a multilayered film structure in which a plurality of layers of Fe or an alloy containing Fe as an essential constituent were laminated together with a plurality of intermediate layers of, other composition. As a result of this research and study, the inventors clarified that the magnetic properties of the magnetic multilayered film could be changed by the intermediate layers of other composition and have achieved the present invention.

More precisely, when a plurality of layers of Fe or an alloy containing Fe as an essential constituent i.e., an Fe-based alloy, are laminated together with a plurality of intermediate layers of a nonmagnetic metal, or more preferably, when the plural layers of Fe or the alloy containing Fe as the essential constituent are epitaxially grown on at least part of the intermediate layers of the nonmagnetic metal, the resultant magnetic multilayered film exhibits desired magnetic properties such as a small coercive force and a high permeability. Although the magnetic multilayered film exhibits a relatively low saturation magnetic flux density as a result of lamination, its saturation magnetic flux density is higher than that of the film including $SiO_2$ or $Al_2O_3$ as its intermediate layers.

Further, when the thickness of each of the intermediate layers of the nonmagnetic metal in the magnetic multilayered film is made smaller than 10 Å or larger than 100 Å, the magnetic multilayered film exhibits a coercive force larger than that obtained when the thickness is within the range of 10 Å to 100 Å. Therefore, the thickness of each of the intermediate layers of the nonmagnetic metal is preferably within the range of 10 Å to 100 Å.

Further, the magnetic properties of the magnetic multilayered film change depending on the thickness of each period including a pair of the Fe or Fe-alloy layer and the intermediate layer in the multilayered film structure. The merit of lamination is reduced when the thickness of each period in the multi-layered film structure is made larger than 1,000 Å. On the other hand, when this thickness is made smaller than 100 Å, a large internal stress is produced in the magnetic multilayered film depending on the kind of the nonmagnetic metal, and a problem arises in that the magnetic multi-layered film tends to be stripped off from its substrate. Therefore, the thickness of each period in the multi-layered film structure lies preferably within the range of 100 Å to 1,000 Å.

Further, a magnetic multilayered film having a small coercive force and a high permeability is obtained when 1 to 20% by atom (referred to hereinafter as at%) of C (carbon) is added to Fe or the alloy containing Fe as the essential constituent in the aforementioned magnetic multilayered film.

The desired magnetic properties such as the small coercive force and the high permeability can be further improved when the nonmagnetic metal forming the intermediate layers in the magnetic multilayered film has a body-centered cubic structure, a face-centered cubic structure or like structure, and the difference between the shortest atomic distance of the nonmagnetic metal and that of the epitaxially grown Fe or epitaxially grown alloy containing Fe as the essential constituent is smaller than 0.04 Å.

Furthermore, a magnetic head having an excellent recording characteristic can be obtained when the magnetic multilayered film of the present invention is used in the magnetic circuit of the magnetic head.

DESCRIPTION OF THE PREFERRED EMBODIMENTS

Preferred embodiments of the present invention will now be described in further details with reference to the drawings and tables.

Embodiment 1

A dual ion beam sputtering apparatus was used for making various magnetic multilayered films to compare the present invention with the prior art. The sputtering was carried out under the following conditions:

Ion gas ... Ar
Pressure of Ar gas in the apparatus ... $2.5 \times 10^{-2}$ Pa
Acceleration voltage of deposition ion gun ... 1,200 V
Ion current of deposition ion gun ... 120 mA
Target current ... 70 mA
Acceleration voltage of substrate ion gun ... 200 V
Ion current of substrate ion gun ... 40 mA
Distance between target and substrate ... 127 mm In the dual ion beam sputtering apparatus used in the experiment, a target holder is rotated during the sputtering process for making the magnetic multilayered films.

Figure 1:
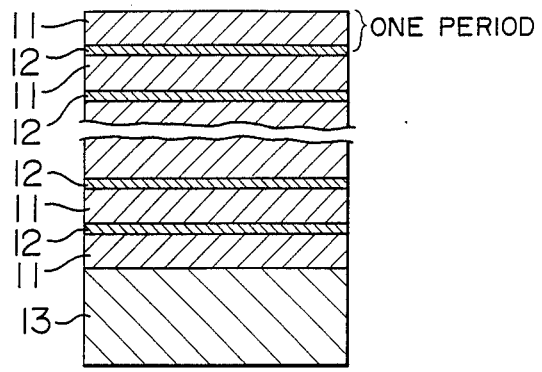
FIG. 1 is a schematic sectional view of an embodiment of the magnetic multilayered film of the present invention.

FIG. 1 is a schematic sectional view of each of the magnetic multilayered films made by sputtering in the dual ion beam sputtering apparatus. Referring to FIG. 1, the magnetic multilayered film comprises a plurality of main magnetic layers 11 of Fe, a plurality of intermediate layers 12 of a nonmagnetic metal or its alloy, and a substrate 13 of glass. Various metals and alloys were used in the experiment to form the intermediate layers 12, and the material of the substrate 13 was a glass No. 7059 made by Corning Glass Works. The number of the main magnetic layers 11 was ten, the thickness of each of the main magnetic layers 11 was 450 Å, the thickness of each of the intermediate layers 12 was 50 Å, and the total thickness of the magnetic multilayered film was about 5,000 Å in any case. These values were fixed for all of samples which will be described with reference to Table 1.

Table 1 shows the relation between the material of the intermediate layers 12 and the coercive force in the hard axis direction as well as the saturation magnetic flux density in the magnetic multilayered films. Table 1 also shows the magnetic properties of a single-layered film of Fe which does not include the intermediate layers 12.

TABLE 1

|  | Material of intermediate layer | Coercive force (Oe) | Saturation flux density (T) |
|---|---|---|---|
|  | None | 15.8 | 2.08 |
| Prior art | $SiO_2$ | 11.6 | 1.78 |
|  | $Al_2O_3$ | 12.5 | 1.71 |
| Present invention | V | 9.0 | 1.88 |
|  | Cr | 5.2 | 1.91 |
|  | Cu | 8.1 | 1.87 |
|  | Nb | 8.5 | 1.92 |
|  | W | 9.2 | 1.91 |
|  | Al | 9.1 | 1.90 |
|  | Pt | 8.7 | 1.93 |
|  | $Cu_{75}Pt_{25}$ | 8.0 | 1.92 |
|  | $Cr_{62}Pt_{38}$ | 9.5 | 1.91 |
|  | $V_{95}C_5$ | 9.2 | 1.87 |
|  | $Cr_{95}Cu_5$ | 6.0 | 1.89 |
|  | $Nb_{80}Cu_{20}$ | 7.8 | 1.92 |

It will be seen in Table 1 that the magnetic multilayered films in each of which the ten main magnetic layers 11 are laminated together with the intermediate layers 12 of the nonmagnetic metal or alloy have a coercive force smaller than 10 Oe. The coercive force of each of these magnetic multilayered films is smaller than that of the magnetic multilayered films in which $SiO_2$ and $Al_2O_3$ are used to form the intermediate layers. Further, the magnetic multilayered films including the intermediate layers formed of $SiO_2$ and $Al_2O_3$ have a saturation magnetic flux density as low as less than 1.8 T. Such a low saturation magnetic flux density is considered to be attributable to the fact that these oxides are porous, and the main magnetic layers of Fe deposited directly on these oxides include many defects including vacancies. On the other hand, the magnetic multilayered films including the intermediate layers of the nonmagnetic metals have a relatively high saturation magnetic flux density of about 1.9 T. Such a high saturation magnetic flux density is considered to be attributable to the fact that, because the energy at the interface between the main magnetic layer of Fe and the intermediate layer of the nonmagnetic metal is low, the main magnetic layer and the intermediate layer make intimate contact with each other without giving rise to any defects.

As described above, the magnetic multilayered film in which the main magnetic layers of Fe are laminated together with the intermediate layers of the nonmagnetic metal exhibits excellent magnetic properties including a small coercive force. Even when nonmagnetic metals other than those shown in Table 1 are used to form the intermediate layers, the coercive force can be decreased by the effect of lamination.

Further, application of heat treatment to the magnetic multilayered film of the present invention can further decrease the coercive force. For example, when the magnetic multilayered film including the intermediate layers of Cr was heat-treated at 300° C. for 1 hour, the coercive force was decreased to 2.0 Oe, and the relative permeability at 5 MHz was 900.

Embodiment 2

Five magnetic multilayered films each including ten main magnetic layers of an alloy material laminated together with intermediate layers of Cu were made under the same sputtering condition as those used to make the first embodiment of the magnetic multilayered film. The alloy materials for the main magnetic layers of the five samples were Fe-12 at% Si, Fe-1.5 at% Ni, Fe-2.0 at% V, Fe-1.7 at% Cr and Fe-1.3 at% Pt respectively. The relation between the material for the main magnetic layers and the coercive force in the hard axis direction of these samples as shown in Table 2. This Table 2 also shows the coercive force of a single-layered film of Fe with no intermediate layer.

TABLE 2

| Material for main magnetic layer | Coercive force of single-layered film (Oe) | Coercive force of multilayered film (Oe) |
| --- | --- | --- |
| Fe-12 at % Si | 8.0 | 4.0 |
| Fe-1.5 at % Ni | 10.2 | 7.5 |
| Fe-2.0 at % V | 10.8 | 8.1 |
| Fe-1.7 at % Cr | 10.0 | 7.7 |
| Fe-1.3 at % Pt | 9.6 | 6.8 |

It will be seen in Table 2 that, by laminating the main magnetic layers of the Fe alloy with the intermediate layers of Cu, the coercive force decreases. Even when an Fe alloy other than those shown in Table 2 is used as the material of the main magnetic layers, the coercive force also decreases because of the effect of lamination together with the intermediate layers of Cu. The effect of lamination is maintained even when the material for the intermediate layers is a nonmagnetic metal other than Cu.

Further, application of heat treatment to the second embodiment of the magnetic multilayered film of the present invention can further decrease the coercive force. For example, when the magnetic multilayered film including the main magnetic layers of the Fe-12 at% Si alloy laminated together with the intermediate layers of Cu was heat-treated at 300° C. for 1 hour, the coercive force was decreased to 0.7 Oe, and the relative permeability at 5 MHz was 1,800.

Embodiment 3

Figure 2:
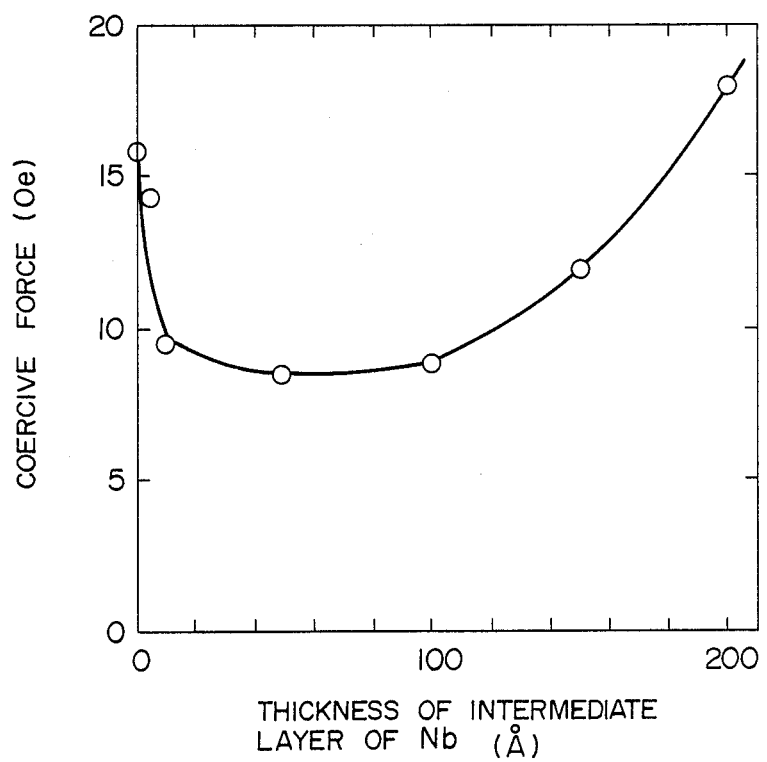
FIG. 2 is a graph showing the relation between the coercive force and the thickness of an intermediate layer of Nb in another embodiment of the present invention in which layers of Fe are laminated together with intermediate layers of Nb.

Magnetic multilayered films each including ten main magnetic layers of Fe laminated together with intermediate layers of Nb were made under the same sputtering conditions as those used to make the first embodiment of the magnetic multilayered film. The thickness of each of the intermediate layers of Nb in one sample was changed from that of another. FIG. 2 shows the relation between the thickness of the intermediate layer of Nb and the coercive force in the hard axis direction. In FIG. 2, the value of coercive force corresponding to the thickness, 0 Å of the intermediate layer represents that of a single-layered film of Fe which does not include the intermediate layers. It will be seen in FIG. 2 showing the dependence of the coercive force on the thickness of the intermediate layer of Nb that the coercive force is relatively small in the range of from 10 Å to 100 Å. The coercive force measured when the thickness of the intermediate layer of Nb is 5 Å is generally equal to that of the single-layered film of Fe. Such a tendency is considered to be attributable to the fact that, at the thickness of 5 Å, the intermediate layer is not uniformly formed and is present in an island-like pattern. The coercive force is also large the thickness of the intermediate layer of Nb exceeds 150 Å. This is considered to be attributable to the fact that the interaction between the two main magnetic layers formed on both sides of the intermediate layer is blocked by the intermediate layer.

Other samples were also made in which various Fe alloys were used to form the main magnetic layers, and various nonmagnetic metals other than Nb were used to form the intermediate layers. The relation between the thickness of the intermediate layer and the coercive force in such samples shown a tendency similar to that shown in FIG. 2.

From the results described above, the thickness of each of the intermediate layers of the non-magnetic metal lies preferably within the range of from 10 Å to 100 521 .

Embodiment 4

Figure 3:
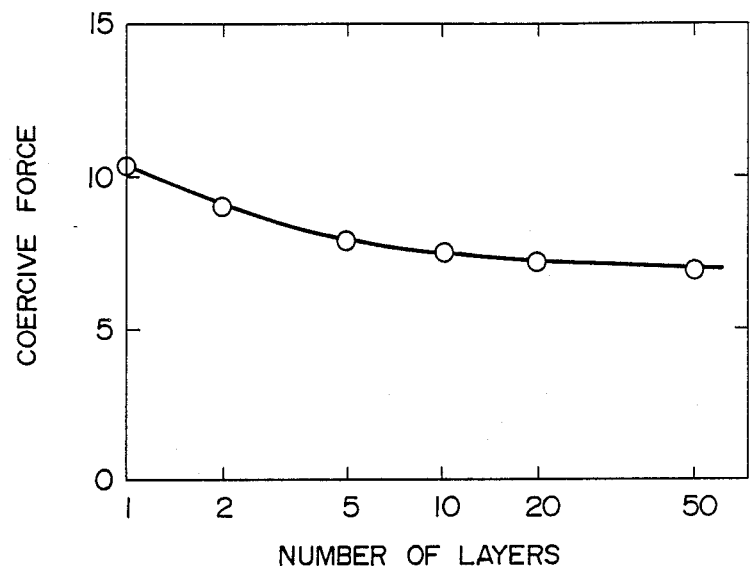
FIG. 3 is a graph showing the relation between the coercive force and the number of main magnetic layers in still another embodiment of the present invention in which main magnetic layers of an Fe-Ni alloy are laminated together with intermediate layers of Cu.

Magnetic multilayered films including various numbers of main magnetic layers of an Fe-1.5 at% Ni laminated together with intermediate layers of Cu were made under the same sputtering conditions as those used to make the first embodiment of the magnetic multilayered film. The thickness of each of the intermediate layers was fixed at 50 Å, and the total thickness of each of the magnetic multilayered films was fixed at about 5,000 Å. The results of measurement of the relation between the number of the main magnetic layers and the coercive force are shown in FIG. 3. The value of coercive force corresponding to one main magnetic layer represents that of a single-layered film of the Fe alloy.

It will be seen in FIG. 3 showing the dependence of the coercive force on the number of the main magnetic layers that the coercive force decreases with the increase in the number of the main magnetic layers. When the number of the main magnetic layers exceeds five, the coercive force decreases to a value smaller than 8 Oe. On the other hand, when the number of the main magnetic layers exceeds fifty, the magnetic multilayered film is easily stripped off from its substrate. Such stripping results from an increased internal stress of the film due to lamination of very thin main magnetic layers.

The results described above teach that the number of the main magnetic layers lies preferably within the range of from 5 to 50, which corresponds to a range of 100 to 1,000 Å in thickness per each period of the multilayered structure. Further, when the total thickness of the magnetic multilayered film was changed between 1,000 Å and 20,000 Å the magnetic multilayered film exhibited excellent soft magnetic properties when the thickness of the multilayered structure deposited in one period range of from 100 Å to 1,000 Å.

Other samples were also made in which various Fe alloys other than the Fe-Ni alloy were used to form the main magnetic layers, and various nonmagnetic metals other than Cu were used to form the intermediate layers. The dependence of the coercive force on the period of lamination showed a tendency generally similar to those described above.

Embodiment 5

Figure 4:
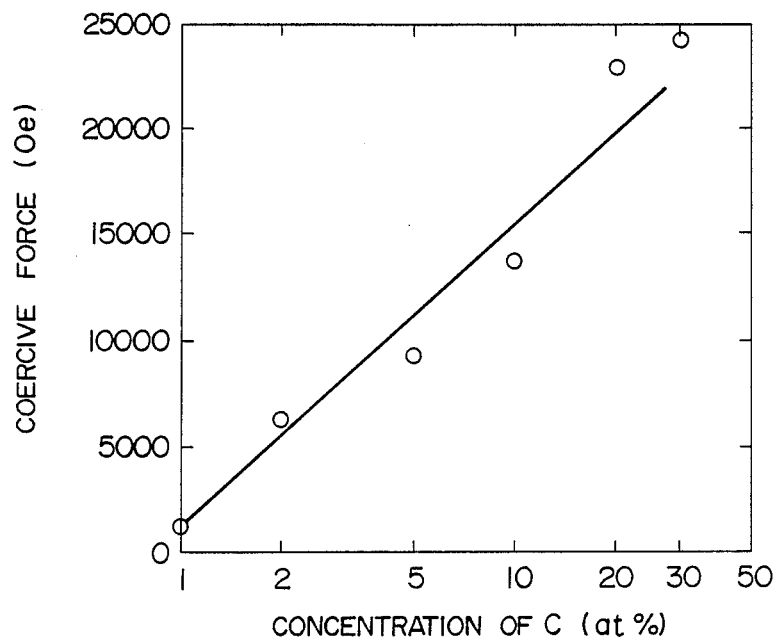
FIG. 4 is a graph showing the relation between the coercive force and the concentration of C in yet another embodiment of the present invention in which main magnetic layers of an Fe-V-C alloy are laminated together with intermediate layers of Nb.

Magnetic multilayered films each including ten main magnetic layers of an Fe-V-C alloy laminated together with intermediate layers of Nb were made under the same sputtering conditions as those used to make the first embodiment of the magnetic multilayered film. The total thickness of each of the magnetic multilayered films was fixed at 5,000 Å, and the thickness of each of the intermediate layers was fixed at 50 Å. The concentration of V in the Fe-V-C alloy was fixed at 2 at%, while that of C was changed between 0 at% and 30 at%. FIG. 4 shows the relation between the coercive force in the hard axis direction and the concentration of C. It will be seen in FIG. 4 that addition of C in an amount less than 1 at% does not appreciably change the coercive force. On the other hand, the coercive force greatly decreases when C is added in an amount more than 1 at%. However, addition of C in an amount more than 20 at% results in stripping off of the magnetic multilayered film from its substrate. This is considered to be attributable to the fact that, since C intrudes into the matrix of Fe to form a solid solution, the presence of C in a large amount results in an increased internal stress.

The results described above teach that, in a magnetic multilayered film made by laminating main magnetic layers of an Fe-V alloy together with intermediate layers of Nb, addition of 1 to 20 at% of C to the Fe-V alloy can further decrease the coercive force of the magnetic multilayered film. The relative permeability can also be increased by the addition of C to the Fe-V alloy.

In a magnetic multilayered film including main magnetic layers of Fe or an Fe alloy other than the Fe-V alloy, its soft magnetic properties are improved by the addition of C to Fe or the Fe-V alloy. In this case, the intermediate layers may be formed of a nonmagnetic metal other than Nb.

Embodiment 6

Magnetic multilayered films each including twenty main magnetic layers of an Fe-10 at% C alloy laminated together with intermediate layers of one of Cr, Ni and permalloy (Ni-19.8 at% Fe) were made under the same sputtering conditions as those used to make the first embodiment of the magnetic multilayered film. The total thickness of each of the magnetic multilayered films was 1 μm, and the thickness of each of the intermediate layers was 50 Å. Each of the magnetic multilayered films was patterned according to the ion milling method. The resultant pattern in each of the magnetic multilayered films was such that film stripes 20 μm wide were alternated with film-free stripes 20 μm wide. The relative permeabilities of the magnetic multilayered films including the intermediate layers of Cr, Ni and permalloy respectively were measured at 1 MHz, 5 MHz, 10 MHz and 20 MHz. The results of measurement are shown in Table 3.

TABLE 3

| Intermediate layer | Relative permeability | | | |
|---|---|---|---|---|
| | 1 MHz | 5 MHz | 10 MHz | 20 MHz |
| Cr | 1,500 | 1,400 | 1,000 | 600 |
| Ni | 1,200 | 1,000 | 500 | 200 |
| Permalloy | 1,300 | 1,000 | 600 | 200 |

It will be seen in Table 3 that the relative permeability of the magnetic multilayered film including the nonmagnetic intermediate layers of Cr is higher than those of the magnetic multilayered films including the ferromagnetic intermediate layers of Ni and permalloy. Further, the difference between the relative permeability of the former and those of the latter is especially large on the high frequency side. The structure of magnetic domains in the film stripes of each of the magnetic multilayered films was observed by the Bitter method. According to the results of observation, triangular magnetic domains were found in the magnetic multilayered films including the ferromagnetic intermediate layers of Ni and permalloy, whereas such triangular magnetic domains were not found in the magnetic multilayered film including the nonmagnetic intermediate layers of Cr. Therefore, it is considered that the improvement in the relative permeability is attributable to the improvement in the structure of magnetic domains resulting from the provision of the nonmagnetic intermediate layers.

In many cases, a magnetic multilayered film is applied to a magnetic head in the form of film stripes. Therefore, it is preferable from the aspect of practical use that the magnetic multilayered film to be applied to the magnetic head is constructed to include nonmagnetic intermediate layers so as to improve the structure of magnetic domains.

Embodiment 7

Magnetic multilayered films each including ten main magnetic layers of Fe, intermediate layers of one of permalloy, Cr, $SiO_2$ and $Al_2O_3$, and a substrate of glass No. 7059 made by Corning Glass Works were made under the same sputtering condition as those used to make the first embodiment of the magnetic multilayered film. The thickness of each of the main magnetic layers was fixed at 450 Å, the thickness of each of the intermediate layers was fixed at 50 Å, and the total thickness of each of the magnetic multilayered films was fixed at about 5,000 Å.

The coercive force in the hard axis direction, the relative permeability at 5 MHz and the saturation magnetic flux density were measured for each of the magnetic multilayered films of the present invention including the main magnetic layers of Fe laminated together with the intermediate layers of permalloy and Cr, respectively. The measured values were compared with those of the prior art magnetic multilayered films including the main magnetic layers of Fe laminated together with the intermediate layers of $SiO_2$ and $Al_2O_3$) respectively. The results are shown in Table 4. Table 4 shows also the magnetic properties of a single-layered film of Fe which includes no intermediate layers.

TABLE 4

| | Material for intermediate layer | Coercive force (Oe) | Relative permeability (at 5 Mz) | Saturation magnetic flux density (T) |
|---|---|---|---|---|
| | None | 15.8 | 230 | 2.08 |
| Present invention | Ni-19.8 at % Fe | 5.5 | 350 | 1.97 |
| | Cr | 5.2 | 370 | 1.91 |
| Prior art | $SiO_2$ | 11.6 | 150 | 1.78 |
| | $Al_2O_3$ | 12.5 | 130 | 1.71 |

It will be seen in Table 4 that the coercive force becomes smaller than that of the single-layered film of Fe when the layers of Fe are laminated. It will also be seen that the coercive force of each of the magnetic multilayered films of the present invention including the intermediate layers of permalloy and Cr, respectively, is far smaller than those of the prior art magnetic multilayered films including the intermediate layers of $SiO_2$ and Al₂O₂, respectively. The relative permeability of each of the magnetic multilayered films of the present invention including the intermediate layers of permalloy and Cr respectively is larger than that of the single-layered film of Fe, but is smaller than those of the prior art magnetic multilayered films including the intermediate layers of $SiO_2$ and $Al_2O_3$ respectively. The saturation magnetic flux density of each of the prior art magnetic multilayered films including the intermediate layers of $SiO_2$ and $Al_2O_3$, respectively is greatly decreased as shown, and these values are smaller than 1.91 T i.e. a value of the saturation magnetic flux density of the conventional magnetic multilayered film using intermediate layers of nonmagnetic material. This value, i.e. 1.91 T, is still smaller than that of a single-layered Fe film due to a decreased total volume of the layers of Fe material by lamination of layers of nonmagnetic material. It is considered that this great decrease in the saturation magnetic flux density occurs for the reason which will be described now. That is, the oxide such as $SiO_2$ or $Al_2O_3$ forming the intermediate layers is porous, and the main magnetic layers of Fe directly deposited on the porous intermediate layers include many defects, including vacancies. It is considered that, because of the presence of vacancies and other defects, the density of Fe decreases resulting in the great decrease in the saturation magnetic flux density. Therefore, a metal is preferably used to form the intermediate layers.

With a view to find out the reason why the lamination of the main magnetic layers together with the intermediate layers of permalloy could improve the soft magnetic properties, magnetic multilayered films including one to thirty main magnetic layers respectively were made. These magnetic multilayered films included the main magnetic layers of Fe and the intermediate layers of permalloy. The thickness of each of the intermediate layers was fixed at 50 Å, and the total thickness of each of the magnetic multilayered films was fixed at about 5,000 Å.

Figure 5:
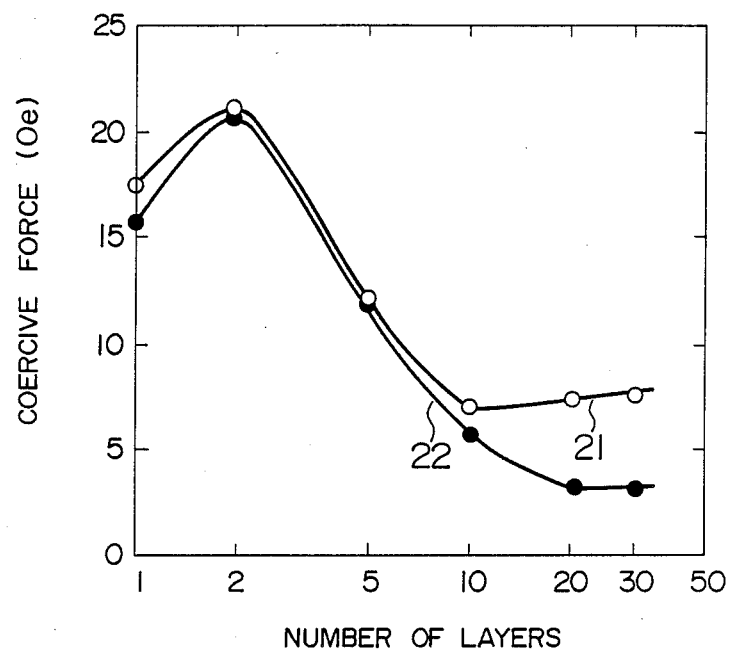
FIG. 5 is a graph showing the relation between the number of main magnetic layers and the coercive force in another embodiment of the present invention.

FIG. 5 shows the relation between the coercive force and the number of the main magnetic layers of Fe. The curve 21 in FIG. 5 represents the coercive force in the easy axis directions, and the curve 22 represents the coercive force in the hard axis direction. It will be seen in FIG. 5 that the coercive force tends to decrease with the increase in the number of the main magnetic layers of Fe.

Figure 6:
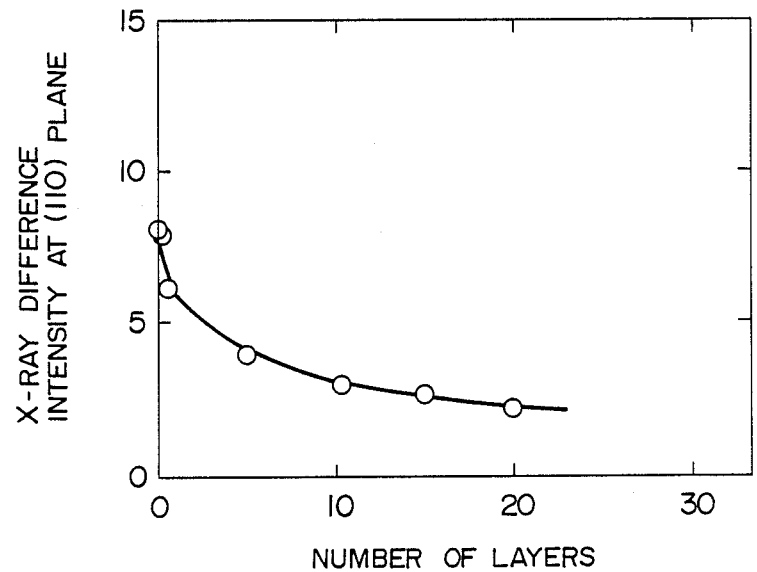
FIG. 6 is a graph showing the relation between the number of main magnetic layers and the X-ray diffraction strength at the (110) plane in still another embodiment of the present invention.

An X-ray diffraction test was conducted on these samples. FIG. 6 shows the relation between the number of the main magnetic layers and the X-ray diffraction intensity at the (110) plane. It will be seen in FIG. 6 that the X-ray diffraction intensity at the (110) plane increases with the increase in the number of the main magnetic layers, in spite of the fact that the volume of Fe occupying the magnetic multilayered film decreases with the increase in the number of the main magnetic layers. This increase in the X-ray diffraction intensity is considered to be attributable to the fact that the epitaxial growth of Fe directly on each of the intermediate layers of permalloy improves the preferred orientation.

More precisely, the main magnetic layer of Fe having the crystal structure of bcc type has its (110) plane oriented in parallel to the surface of the substrate. When the intermediate layer of permalloy having the crystal structure of $Cu_3Au$ type analogous to the fcc type is directly deposited on the main magnetic layer of Fe, the (100) plane of the permalloy is oriented on the (110) plane of Fe. The reason will now be considered. The shortest atomic distance in Fe, that is, the distance between its atom occupying the position (0, 0, 0) and its atom occupying the position (½, ½, ½) is 2.4774 Å, and these atoms are located on the (110) plane of Fe. Also, the shortest atomic distance in the permalloy, that is the distance between its atom occupying the position (0, 0, 0) and its atom occupying the position (½, ½, 0), is 2.5119 Å, and these atoms are located on the (100) plane of the permalloy. Thus, the shortest atomic distance in permalloy is very close to that in Fe. Therefore, it is considered that the (100) plane of the permalloy is oriented on the (110) plane of Fe, and the (110) plane of Fe is then oriented on the (100) plane of the permalloy, and so on. As a result of observation of such a manner of growth by a reflection type high energy electron diffraction device, the inventors confirmed that epitaxial growth of Fe actually occurred in some regions. Epitaxial growth of Fe also occurred even when the (111) plane of the permalloy was oriented. Further, the inventors found out that, when the (110) plane of Cr having the crystal structure of bcc type was oriented, epitaxial growth of Fe occurred.

Thus, the epitaxial growth improves the preferred orientation. Therefore, the soft magnetic properties of the magnetic multilayered film including the main magnetic layers of Fe laminated together with the intermediate layers of permalloy or Cr can be improved.

Even when an Fe alloy other than Fe alone is used to form the main magnetic layers of the magnetic multilayered film, the soft magnetic properties are also improved due to local epitaxial growth of the alloy as described above.

Embodiment 8

Magnetic multilayered films each including ten main magnetic layers of Fe laminated together with intermediate layers of one of Ni, Cr, permalloy, Cu, V, Pd and Ta were made under the same sputtering conditions as those used to make the first embodiment of the magnetic multilayered film. The thickness of each of the main magnetic layers was fixed at 450 Å, the thickness of each of the intermediate layers was fixed at 50 Å, and the total thickness of each of the magnetic multilayered films was fixed at about 5,000 Å.

Figure 7:
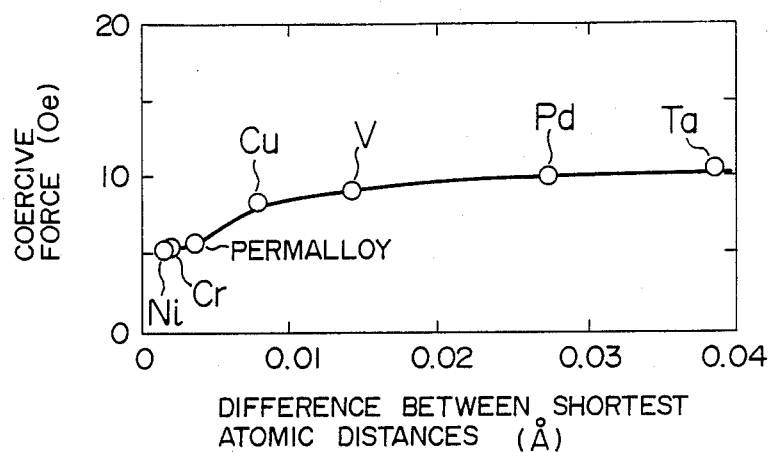
FIG. 7 is a graph showing the relation between the coercive force and the difference between the shortest atomic distance of Fe forming main magnetic layers and that of various materials forming intermediate layers in yet another embodiment of the present invention.

FIG. 7 shows the relation between the coercive force of each of the magnetic multilayered films in the hard axis direction and the difference between the shortest atomic distance of Fe and that of the material forming the intermediate layers in that magnetic multilayered film. It will be seen in FIG. 7 that the coercive force is smaller than 6 Oe when the difference between the shortest atomic distance of Fe and that of the material forming the intermediate layers in that magnetic multilayered film is selected to be smaller than 0.04 Å. It is considered that epitaxial growth of Fe forming the main magnetic layers becomes easy when the difference between the shortest atomic distances described above is smaller than 0.04 Å. The crystal structures of the materials for the intermediate layers shown in FIG. 7 belong to the body-centered cubic structure, face-centered cubic structure and the like.

When an Fe alloy, instead of Fe, is selected to form the main magnetic layers of the magnetic multilayered film, the difference between the shortest atomic distance of Fe in the Fe alloy and that of the material forming the intermediate layers can be decreased to less than 0.04 Å by suitably selecting the material forming the intermediate layers, and excellent soft magnetic properties can be obtained. In this case, the material for the intermediate layers may be other than those shown in FIG. 7, provided that the material satisfies the condition described above.

The soft magnetic properties of the magnetic multilayered film of the present invention can be further improved by application of heat treatment to the film. For example, when the magnetic multilayered film including the ten main magnetic layers of Fe laminated together with the intermediate layers of permalloy is heat-treated at 300° C. for 1 hour, the film exhibits a coercive force of 1.6 Oe and a relative permeability of 840.

Further, when the main magnetic layers of the magnetic multilayered film of the present invention are formed of an Fe alloy containing 1 to 20 at% of C (carbon), the film has more excellent soft magnetic properties.

Embodiment 9

Figure 8A:
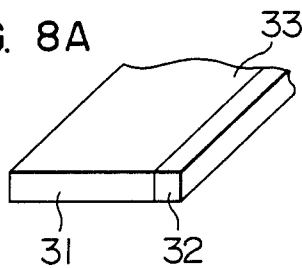
FIGS. 8A to 8E are perspective views showing successive steps for making an embodiment of the magnetic head of a single pole type of the present invention used for perpendicular magnetic recording.
Figure 8B:
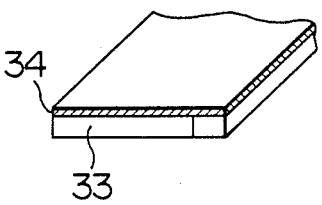
Figure 8C:
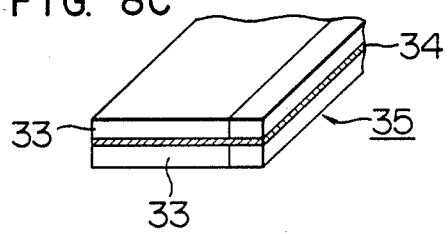
Figure 8D:
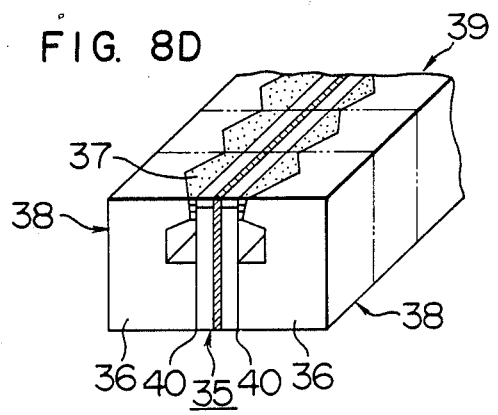
Figure 8E:
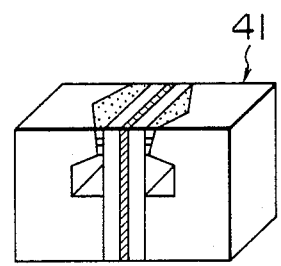

A magnetic multilayered film (having a thickness of 0.2 μm) of the present invention including five main magnetic layers of an Fe-1.5 at% Ni-5.5 at% C laminated together with intermediate layers of Cr was used to make a magnetic head 41 of the single pole type adapted for perpendicular magnetic recording. The magnetic head 41 had a structure as shown in FIG. 8E. As a comparative example, a prior art alloy film (having a thickness of 0.2 μm) formed of permalloy (Ni-19.8 at% Fe) was also used to make such a magnetic head 41.

The steps for making this magnetic head 41 will be described with reference to FIGS. 8A to 8D. Referring to FIG. 8A, a substrate 33 was composed of a piece of Mn-Zn ferrite 31 and a piece of high-melting glass 32. A magnetic film 34 as described above was deposited on one surface of the substrate 33 by means of ion beam sputtering as shown in FIG. 8B. A layer of lead glass for bonding purpose was then deposited by means of ion beam sputtering to cover the surface of the magnetic film 34, and the substrate 33 shown in FIG. 8A was then superposed on the lead glass layer. The assembly was then heated at 450° C. for 30 minutes to fuse the bonding-purpose lead glass thereby making a main magnetic pole block 35 as shown in FIG. 8C. A pair of sub-magnetic pole blocks 38, each of which was composed of a piece of Mn-Zn ferrite 36 and a piece of high-melting glass 37, were prepared, and, after deposition of a layer of lead glass for bonding purpose on each of mating surfaces 40, the main magnetic pole block 35 was sandwiched between the mating surfaces 40 of the sub-magnetic pole blocks 38. The assembly was then heated at 450° C. for 30 minutes to fuse the bonding-purpose lead glass thereby making a bonded block 39 as shown in FIG. 8D. The bonded block 39 was then cut along the two-dot chain lines shown in FIG. 8D to obtain the magnetic head 41 of the single pole type adapted for perpendicular magnetic recording as shown in FIG. 8E.

The recording characteristic of the magnetic head made by the above steps and having the magnetic multilayered film of the present invention and that of the magnetic head having the prior art permalloy film were measured by the use of a Co-Cr perpendicular recording medium. A reading head having a permalloy film was used for reading. The results of measurement proved that the output of the magnetic head having the magnetic multilayered film of the present invention was higher by about 5 dB than that of the magnetic head having the prior art permalloy film. Thus, it was clarified that the magnetic head having the magnetic multilayered film of the present invention had an excellent recording characteristic. It was also clarified that a magnetic head having a magnetic multilayered film including main magnetic layers of partly epitaxially grown Fe or a partly epitaxially grown Fe alloy had similarly an excellent recording characteristic.

It will be understood from the foregoing detailed description that the magnetic multilayered film of the present invention, in which its main magnetic layers formed of Fe or an alloy containing Fe as an essential constituent are laminated together with intermediate layers of a nonmagnetic metal has excellent magnetic properties including a small coercive force, a high permeability and a high saturation magnetic flux density. Further, when at least part of the main magnetic layers of Fe or of the Fe alloy in the magnetic multilayered film is formed by epitaxial growth, the magnetic multilayered film has also excellent magnetic properties including a small coercive force and a high permeability. Also, when the difference between the shortest atomic distance of the material forming the main magnetic layers and that of the material forming the intermediate layers is selected to be smaller than 0.04 Å, the epitaxial growth of the main magnetic layers can be promoted. Further, the soft magnetic properties of the magnetic multilayered film can be improved when the thickness of each of the intermediate layers is selected to lie between 10 Å and 100 Å. Also, the soft magnetic properties can be improved when the thickness of the multilayered structure laminated in one period is selected to lie between 100 Å and 1,000 Å. The soft magnetic properties can be further improved when 1 to 20 at% of C is added to Fe or the Fe alloy forming the main magnetic layers. When the magnetic multilayered film of the present invention is used in a magnetic circuit of a magnetic head, the magnetic head exhibits an excellent recording characteristic.

We claim:

1. A magnetic multilayered film comprising a plurality of layers of Fe or of an Fe-based alloy, said Fe layers of said Fe alloy layers being laminated together with a plurality of intermediate layers of a nonmagnetic metal, wherein each of said Fe layers or each of said Fe-based alloy layers is epitaxially grown on at least part of each of said intermediate layers of the nonmagnetic metal.

2. A magnetic multilayered film according to claim 1, wherein said nonmagnetic metal is at least one of those selected from the group consisting of V, Cr, Cu, Nb, W, Al and Pt.

3. A magnetic multilayered film according to claim 2, wherein the thickness of the multilayered structure deposited in one period lies within the range of from 100 Å to 1,000 Å.

4. A magnetic multilayered film according to claim 1 wherein the crystal structure of said nonmagnetic metal is a body-centered cubic structure, a face-centered cubic structure or like structure, and the difference between the shortest atomic distance of said Fe or said Fe-based alloy and that of said nonmagnetic metal is smaller than 0.04 Å.

5. A magnetic multilayered film according to claim 1, which the thickness of each of said intermediate layers of the nonmagnetic metal lies within the range of from 10 Å to 100 Å.

6. A magnetic multilayered film according to claim 1, wherein the thickness of the multilayered structure deposited in one period lies within the range of from 100 Å to 1,000 Å.

7. A magnetic multilayered film according to claim 1, wherein said Fe-based alloy further contains 1 to 20% by atom of C.

8. A magnetic head including a magnetic film in at least part of its magnetic circuit, said magnetic film having a multilayered film structure in which a plurality of layers of Fe or of an Fe-based alloy are laminated together with a plurality of intermediate layers of a nonmagnetic metal, wherein each of said Fe layers or each of said Fe-based alloy layers is epitaxially grown on at least part of each of said intermediate layers of the nonmagnetic metal.

9. A magnetic head according to claim 8, wherein said nonmagnetic metal is at least one of those selected from the group consisting of V, Cr, Cu, Nb, W, Al and Pt.

10. A magnetic head according to claim 8, wherein each of said Fe layers or each of said Fe-based alloy layers is epitaxially grown on at least part of each of said intermediate layers of the nonmagnetic metal.

11. A magnetic head according to claim 10, wherein the crystal structure of said nonmagnetic metal is a body-centered cubic structure, a face-centered cubic structure or like structure, and the difference between the shortest atomic distance of said Fe or said Fe-based alloy and that of said nonmagnetic metal is smaller than 0.04 Å.

12. A magnetic head according to claim 8, wherein the thickness of each of said intermediate layers of the nonmagnetic metal lies within the range of from 10 Å to 100 Å, and the thickness of the multilayered structure deposited in one period lies within the range of from 100 Å to 1,000 Å.

13. A magnetic head according to claim 8, wherein said Fe-based alloy further contains 1 to 20% by atom of C.

14. A magnetic multilayered film comprising a plurality of layers of Fe or of an alloy containing Fe as an essential constituent and further containing 1 to 20% by atom C, said Fe layers or said Fe alloy layers being laminated together with a plurality of intermediate layers of a non-magnetic metal.

15. A magnetic head including a magnetic film in at least part of its magnetic circuit, said magnetic film having a multilayered film structure in which a plurality of layers of Fe or of an alloy containing Fe as an essential constituent and further containing 1 to 20% by atom C are laminated together with a plurality of intermediate layers of a nonmagnetic metal.

* * * * *